United States Patent
Kröner

(10) Patent No.: US 6,928,268 B1
(45) Date of Patent: Aug. 9, 2005

(54) METHOD FOR ALLOCATING A TRANSMISSION CAPACITY TO CONNECTIONS IN A RADIO COMMUNICATION SYSTEM

(75) Inventor: Hans Kröner, Geislingen (DE)

(73) Assignee: Siemens Aktiengesellschaft, Munich (DE)

( * ) Notice: Subject to any disclaimer, the term of this patent is extended or adjusted under 35 U.S.C. 154(b) by 351 days.

(21) Appl. No.: 09/611,772

(22) Filed: Jul. 7, 2000

(30) Foreign Application Priority Data

Jul. 7, 1999 (DE) .............................. 199 31 236

(51) Int. Cl.[7] .............................. H04B 1/00; H04B 7/00
(52) U.S. Cl. .................... 455/69; 455/63.1; 455/67.11; 455/67.13; 455/67.16; 455/423; 455/522; 370/252
(58) Field of Search ........................ 455/63, 67.1, 67.4, 455/522, 67.11, 67.13, 67.16, 63.1–63.3, 455/68–69, 422.1, 423–425; 379/365, 368; 370/252, 465–468

(56) References Cited

U.S. PATENT DOCUMENTS

| | | | |
|---|---|---|---|
| 4,972,506 A | | 11/1990 | Uddenfeldt .................. 455/33 |
| 5,734,967 A | | 3/1998 | Kotzin et al. .................. 455/63 |
| 5,842,113 A | * | 11/1998 | Nanda et al. .................. 455/69 |
| 5,983,383 A | * | 11/1999 | Wolf .......................... 714/755 |
| 5,991,331 A | * | 11/1999 | Chennakeshu et al. ..... 375/136 |
| 6,041,034 A | * | 3/2000 | Fukumasa et al. .......... 370/203 |
| 6,134,220 A | * | 10/2000 | Le Strat et al. ............. 370/252 |
| 6,243,584 B1 | * | 6/2001 | O'Byrne ..................... 455/447 |
| 6,339,697 B1 | * | 1/2002 | Ranta .......................... 455/63 |
| 6,339,705 B1 | * | 1/2002 | Pehrson ..................... 455/419 |
| 6,353,638 B1 | * | 3/2002 | Hottinen et al. ............ 375/260 |
| 6,359,877 B1 | * | 3/2002 | Rathonyi et al. ........... 370/349 |
| 6,400,929 B1 | * | 6/2002 | Ue et al. ...................... 455/69 |
| 6,473,399 B1 | * | 10/2002 | Johansson et al. .......... 370/229 |
| 6,496,543 B1 | * | 12/2002 | Zehavi ....................... 375/295 |

FOREIGN PATENT DOCUMENTS

| | | |
|---|---|---|
| DE | 197 52 197 A1 | 5/1999 |
| EP | 0 920 144 A2 | 6/1999 |
| WO | WO 96/04718 | 2/1996 |

OTHER PUBLICATIONS

3GPP, TSG RAN WG 2 "Radio Interface Protocol Architecture", TS RAN S2.01 v0.1.0 (Feb. 1999).

* cited by examiner

Primary Examiner—Vivian Chin
Assistant Examiner—Tuan Tran
(74) Attorney, Agent, or Firm—Laurence A. Greenberg; Werner H. Stemer; Ralph E. Locher

(57) ABSTRACT

According to the invention, a connection between a base transceiver station and a subscriber station is allocated a transmission rate for signal transmission from the base transceiver station to the subscriber station on the basis of a connection-specific level of path damping.

30 Claims, 3 Drawing Sheets

Fig. 3

| Parameter | Strategy 1 | Strategy 2 | Strategy 3 |
|---|---|---|---|
| Number of subscribers at 8 kbit/s | 40 | 13 | 13 |
| Number of subscribers at 16 kbit/s | 0 | 27 | 27 |
| Total transmission rate kbit/s | 320 | 536 | 536 |
| Total transmitter power in the DL (dBm) | 23.4 | 23.6 | 31.7 |

METHOD FOR ALLOCATING A TRANSMISSION CAPACITY TO CONNECTIONS IN A RADIO COMMUNICATION SYSTEM

The invention relates to a method for allocating transmission capacity to connections in a radio communication system, particularly in a mobile radio system or wireless subscriber line system.

Figure 1:
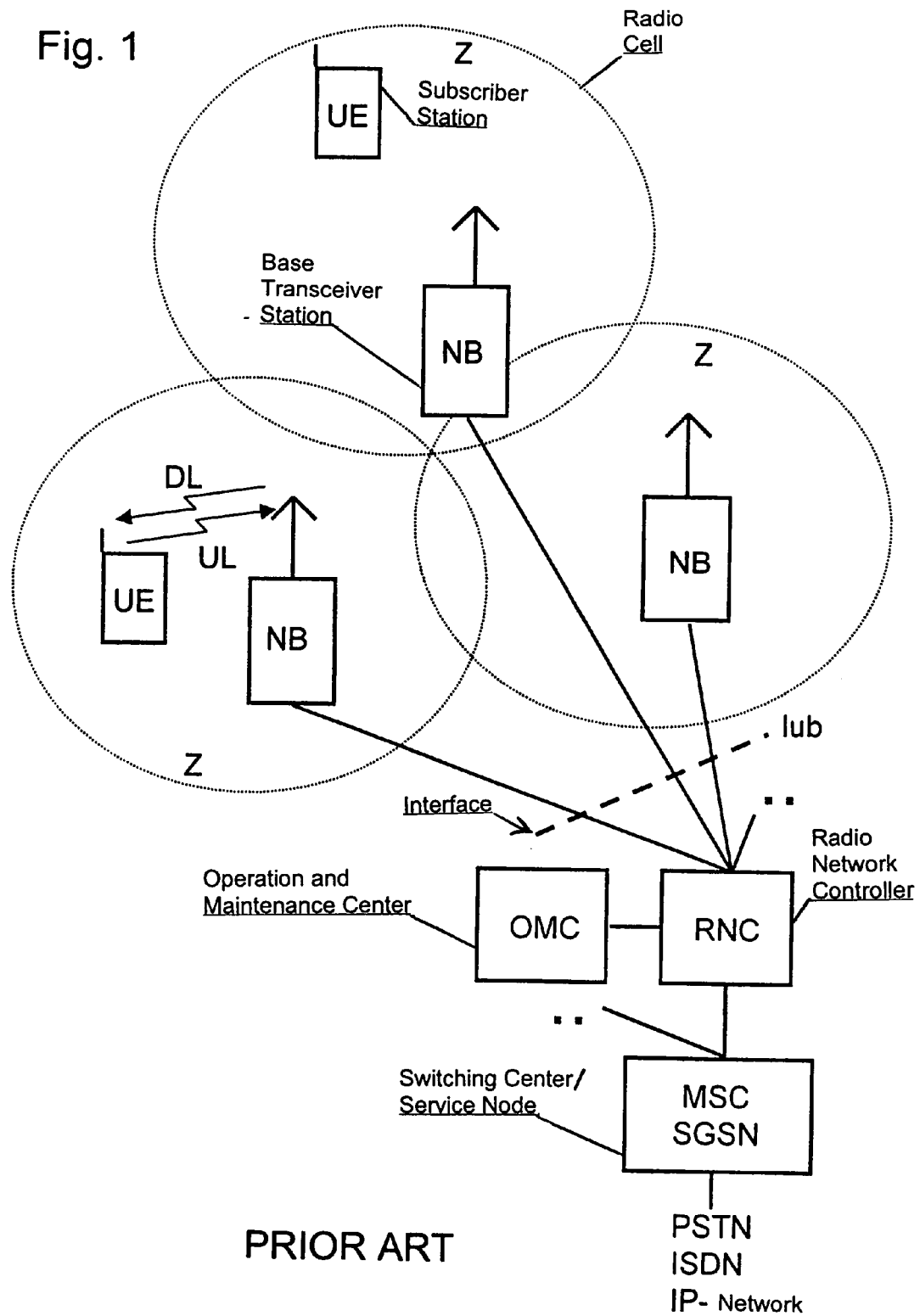

In a radio communication system, data, for example from a voice or multimedia service, is transmitted using electromagnetic waves. In this context, the electromagnetic waves are radiated at carrier frequencies situated in the frequency band provided for the respective system. A radio communication interface is used to set up connections between at least one base transceiver station NB (Node B) and a plurality of subscriber stations UE (User Equipment), which may be mobile or else stationary transceivers and are the bottommost elements in the system. A base transceiver station NB supplies radio-oriented resources to an area of up to several square kilometers in size, a so-called radio cell Z. The physical limitation of a radio cell means that the limited resource is able to reuse carrier frequencies at a certain range at the same time without the radio channels interfering with one another. For this purpose, a plurality of radio cells Z form a cluster governed jointly by a radio network controller RNC. In turn, a plurality of radio network controllers RNC are connected by means of a mobile switching center MSC or serving GPRS service node (SGSN), which are used, inter alia, to access the analog and digital landline network PSTN, ISDN, a packet switching network, in particular an IP network, or a further mobile radio network. FIG. 1 is a schematic illustration of such a cellular radio network.

In order to satisfy the available spectrum's demand for the scarce resource of "carrier frequencies" better, synchronous multiplex methods based on frequency-selective, time-selective and/or spreading-code-selective multiple access have been introduced to distribute the transmission capacity of a radio channel over a plurality of connections, said methods accordingly being called FDMA (Frequency Division Multiple Access), TDMA (Time Division Multiple Access) and CDMA (Code Division Multiple Access). For this purpose, in consultation between the transmitter and the receiver with the inclusion of the base transceiver stations, a prescribed frame comprising transmission-synchronous and reception-synchronous frequency bands, time slots and/or code sequences is used. The transmitters assign the data for the individual connections to this frame and the receivers separate the data intended for them from the received data stream. A disadvantage of this synchronous multiplex method is that the transmission capacity of such a circuit-switched connection is firmly prescribed by the multiplex frame, and transmission capacity cannot be released for other radio transmissions even if no transmission capacity is currently required.

A further basic method is packet switching. This is based on the joint use of a radio channel having a high transmission capacity by a plurality of different connections. For this method too, the radio channel is subdivided on the time axis, although not into fixed time slots, but rather into addressed data packets of variable length. The data is transmitted varying over time, which is why reference may also be made to an asynchronous multiplex method. Any transmitter can access the hitherto unused transmission capacity at any time and transmit its data, for example using a stochastic access method. In addition, the data rate of a bearer is very easy to vary smoothly. The transmitter can influence the data rate both by means of the time intervals at which it sends the data packets, and also by means of the length thereof.

Future mobile radio systems, such as the UMTS (Universal Mobile Telecommunication System), will offer radio subscribers a multiplicity of different services at different data rates. In addition to pure voice transmission, multimedia applications with the associated diversity of services will make up a large part of the data volume. Packet data transmission on the radio communication interface is particularly promising in this area.

For two-way message transmission in the uplink and in the downlink, the UMTS radio communication system is provided with both the so-called TDD mode (TDD=time division duplex), a combination of a wideband TDMA/FDMA system with a CDMA system, and the FDD mode (FDD=frequency division duplex), a wideband CDMA system (W-CDMA). The two modes promise a high degree of flexibility and efficiency for different data rates and demands on quality of service (QoS). This is achieved, in particular, by the Code Division Multiple Access method (CDMA), in which each carrier uses a different combination of short and long code sequences for transmitting messages between radio stations. The receiver restores an individual carrier by correlating the received data stream with the appropriate short and long code sequences. This access method provides very flexible allocation of radio channel resources, because it supports carriers with different peak values for the data rate and carriers with variable data rates.

The object of the invention is to specify a method which allows efficient use of the available transmission capacity as a result of improved allocation of transmission capacity to connections. This object is achieved by the method in accordance with independent claim 1 and by the radio communication system in accordance with independent claim 28. Advantageous refinements of the invention can be found in the dependent claims.

According to the invention, a connection between a base transceiver station and a subscriber station is allocated a transmission rate for signal transmission in the downlink from the base transceiver station to the subscriber station on the basis of a connection-specific level of path damping.

Illustrative embodiments of the invention are explained in more detail with reference to the figures and on the basis of the document 3GPP, TSG RAN WG 2 "Radio Interface Protocol Architecture", TS RAN S2.01 v0.1.0, February 1999.

Figure 2:
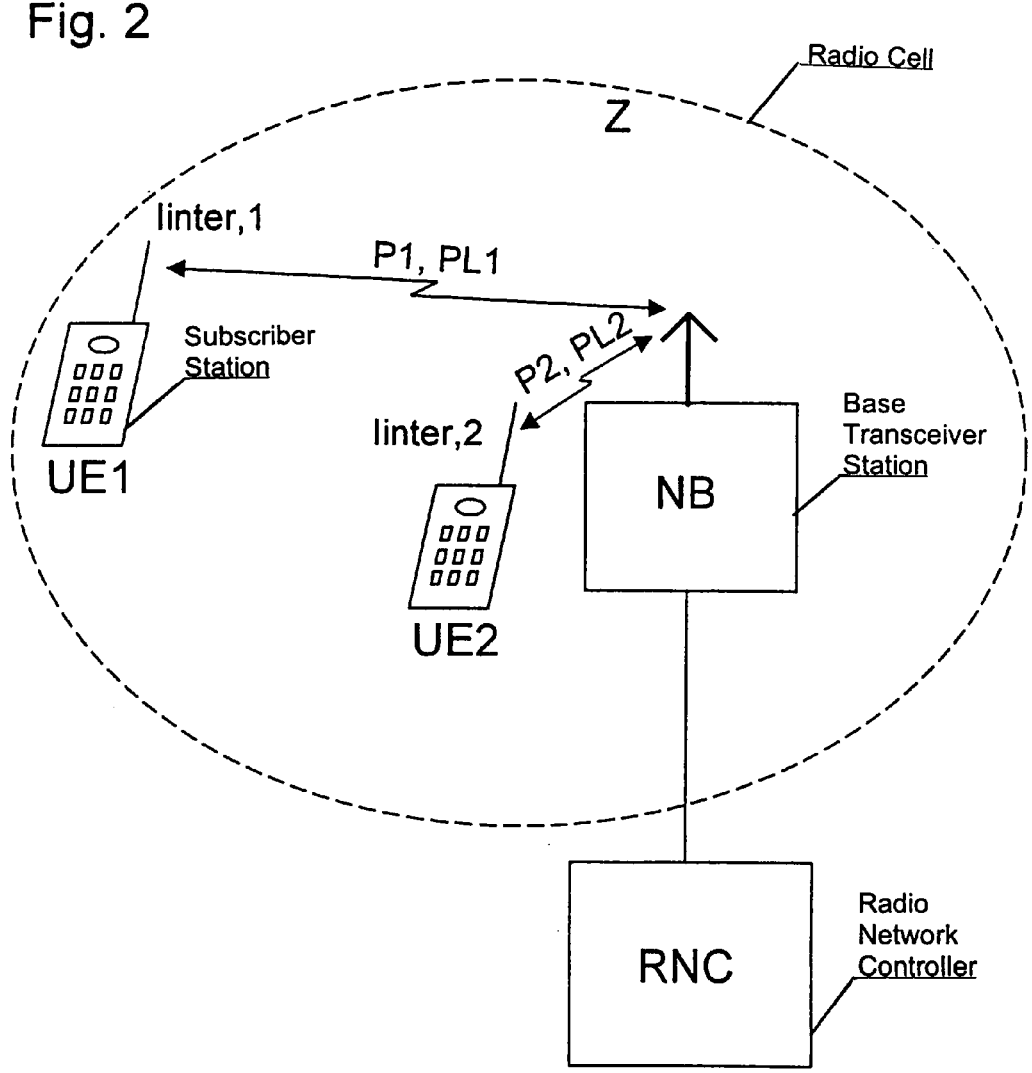

In the Figs.,

FIG. 1 shows a schematic illustration of a radio communication system, in particular a mobile radio system, FIG. 2 shows a block diagram of an illustrative arrangement of two subscriber stations within a radio cell of a base transceiver station, and FIG. 3 shows a comparison of three strategies for allocating transmission rates to connections.

FIG. 2 shows an illustrative arrangement in which a first subscriber station UE1 is situated at a long distance from a base transceiver station NB, or close to the radio cell border, and a second subscriber station UE2 is situated close to the base transceiver station NB. First, just the case of signal transmission in the downlink DL is considered. In addition, it is assumed that the radio communication system supports a CDMA subscriber separation method, with orthogonal CDMA codes being used in the downlink.

As the following description reveals, the method according to the invention takes into account the special property of a radio transmission that the necessary transmitter power $P1$, $P2$ rises with the level of path damping $PL1$, $PL2$ between the base transceiver station NB and the respective subscriber station UE1, UE2. Since the system capacity of the radio communication system is predominantly restricted by interference effects, the second subscriber station UE2 requires, with a low level of path damping PL2, only a relatively small proportion of the total transmitter power for the downlink DL and a small proportion of the resources available on the radio communication interface, irrespective of the real transmission rate.

The interference is produced by the total transmitter power at the location of the base transceiver station NB. The interference at the location of the first subscriber station UE1 on the border of the radio cell Z is primarily produced by receiver noise No and intercell interference Iinter,1 caused by base transceiver stations NB in neighboring radio cells Z, whereas the interference at the location of the second subscriber station UE2 close to the base transceiver station NB is primarily produced by intercell interference caused by other subscriber stations UE in the same radio cell Z, and only a small proportion of it is produced by intercell interference Iinter,2.

The transmitter power P2 for signal transmission to the second subscriber station UE2 close to the base transceiver station NB thus contributes only a very small part to the total interference within the radio cell Z.

For the arrangement described, a signal/interference ratio SIR1, SIR2 for the two subscriber stations UE1, UE2 and also a ratio of the transmitter powers P1, P2 are ascertained below.

In addition to the described parameters transmitter power P1, P2, intercell interference Iinter,1, Iinter,2 and receiver noise No, a processing gain PG1, PG2, which is attained by despreading and decoding the received signal, and an orthogonality factor OF1, OF2, which describes the suppression of the intercell interference owing to the use of orthogonal spreading codes, are considered. The processing gain PG1, PG2 is defined as the respective ratio between the chip rate and the net data rate for the respective carrier. The orthogonality factor OF1, OF2 is dependent on signal delay differences and is accordingly lower for the second subscriber station UE2 close to the base transceiver station NB.

Assuming that PL1>>PL2, and hence P1>>P2, the signal/interference ratio SIR1 for the first subscriber station UE1 can be ascertained as follows:

$$SIR1 \approx \frac{PG1 \cdot P1/PL1}{No + Iinter, 1} \quad (1)$$

Disregarding the receiver noise No and the intercell interference Iinter,2, the signal/interference ratio SIR2 for the second subscriber station UE2 can be ascertained as follows:

$$SIR2 \approx \frac{PG2 \cdot P2/PL2}{OF2 \cdot P1/PL2} = \frac{PG2 \cdot P2}{OF2 \cdot P1} \quad (2)$$

Hence, (2) provides the ratio between the transmitter powers:

$$\frac{P2}{P1} = \frac{SIR2}{PG2} \cdot OF2 \quad (3)$$

With an illustrative processing gain of 512 for a voice connection, a signal/interference ratio of 4 or 6 dB and an orthogonality factor of 0.1, the ratio obtained for the transmitter powers is 1/1280. This proves that the second subscriber station UE2 contributes only marginally to the total transmitter power in the downlink DL, and hence also causes only a very low level of interference in the radio cell Z.

Consideration of this finding allows the transmission resources to be used more effectively according to the invention. Thus, for example, the transmitter power P2 or the signal/noise ratio for the connection to the second subscriber station UE2 can be increased to improve transmission quality, without any negative effects on the interference in the downlink DL. In addition, by way of example, the transmission rate for the connection to the second subscriber stations UE2 can be increased without any rise in the effective level of system loading. This method can be used advantageously for non-real-time services which can adaptively match their transmission rate to the particular resources currently available. In the same way, the method can be used for real-time services such as voice transmission, for example if so-called adaptive multirate coding (AMR) is supported. In the case of a high level of system loading or in the case of blocking—for example if the necessary transmitter power exceeds the maximum transmitter power of the base transceiver station NB—, the requirements for services with a high path loss can be reduced. This may be done, by way of example, by reducing the data rate or the desired signal/interference ratio.

Increasing the transmission capacity for the downlink DL is of particular significance because many data services, for example from database providers, have very asymmetrical requirements, that is to say the volume of data, and hence the level of traffic loading, in the downlink DL is much higher than the level of traffic loading in the uplink UL. An improved throughput in the downlink DL is therefore equivalent to a larger number of carriers which can be provided within the radio cell Z, which increases the effective transmission capacity.

Various strategies can be used to allocate a transmission rate B to a connection.

According to a first known strategy, all carriers are allocated an identical transmission rate B, irrespective of the effective level of path damping. In this context, all carriers have identical characteristic features, such as the signal/interference ratio SIR and the processing gain PG. This allocation results, on the one hand, in an asymmetrical distribution of transmitter powers, but, on the other hand, in a constant transmission rate B and quality of service QoS for all subscribers.

According to a second strategy for allocating transmission rates B to carriers, the different level of path damping PL for the respective subscriber stations UE is taken into account. A connection having a lower level of path damping PL can be allocated a higher transmission rate B, for example. This results in less variation in the transmitter power for the individual connections, and, as described above, in optimized use of the available resources. This method can be used for connections in which the transmission rate for at least one service can vary.

The general functional correlation that the transmission rate B is a function of the respective level of path damping PL can be used to define the transmission rate Bi of a carrier i as being a function of the respective level of path damping PLi in the downlink DL. In this case, by way of example, the present level of path damping can be compared with a threshold value PLthreshold, with a respective spectrum of path damping levels corresponding to a particular transmission rate. The respective transmission rate Bi for the carrier i is thus ascertained by multiplying a base transmission rate B by a factor n for a respective spectrum of path damping levels:

$$Bi = n \cdot B \text{ for } PLthreshold, n \geq PLi > PLthreshold, n+1 \qquad (4)$$

For a wideband CDMA system, it is also possible, by way of example, to provide for the transmission rate Bi of the respective carrier i to be doubled in each case on the basis of the following equation:

$$Bi = 2^{(n-1)} \cdot B \text{ for } PLthreshold, n \geq PLi > PLthreshold, n+1 \qquad (5)$$

According to a further alternative strategy for allocating transmission rates to carriers, the relative or absolute transmitter power Pi required for a respective carrier i is taken into consideration. In this context, the relative transmitter power Pi is the ratio of the transmitter power Pi to the total transmitter power of the base transceiver station NB. The transmission rate Bi of the carrier i is therefore a function of this ratio.

The following numerical example reveals how the total transmission rate in kbit/s in a radio cell Z can be increased when using the invention's second strategy described for allocating transmission rates to connections, as compared with the known first strategy with an identical transmission rate for all connections. Furthermore, the result of a third strategy is shown, in which the transmission rate for a connection is selected randomly and irrespective of any path damping.

In the illustrative calculation, the following requirements for the radio communication interface are assumed:
Environment Living area, residential district
Mobility Pedestrian
Radio cell Microcell In addition, the following system parameters are taken as a basis for these requirements:
Number of carriers 40
SIR 4 (6 dB)
Basic transmission rate B 8 kbit/s
Processing gain PG 512
Orthogonality factor 0.06
Standard deviation of log
normal distributed fading 10 dB
Interference coupling 2
Basic path damping PL 127 dB
Radio cell radius 300 m
Receiver noise No —102 dBm In addition, it is assumed that the subscriber stations are distributed evenly in the radio cell—the probability that a subscriber station is at a particular range rises linearly with the range.

The respective result of the three allocation strategies is revealed in the table of FIG. 3.

For the result for strategy 2, that is to say the allocation of transmission rates on the basis of the respective level of path damping, a transmission rate of 8 kbit/s has been selected for a level of path damping PL >120 dB, whereas a transmission rate of 16 kbit/s has been selected for a level of path damping $\leq$120 dB. For strategy 3, the number of subscribers per transmission rate is equivalent to the respective number for strategy 2.

The results clearly reveal that the total transmission rate in kbit/s has increased with strategy 2, with the total transmitter power having increased only marginally. To achieve the same total transmission rate, a much higher total transmitter power is necessary for the third strategy.

In the case of the result for strategy 2 it should be taken into account that, in the context of allocation that is dependent on path damping, an increase in the transmission rate to 16 kbit/s requires a corresponding increase in the transmitter power by approximately 3 dB, whereas the demands on the transmitter power for the lower transmission rate of 8 kbit/s are virtually identical. This means that the individual transmitter powers are assimilated when the total transmitter power is increased only marginally.

The following text describes an illustrative network-side implementation of the method according to the invention. The basis used for this is the layer and protocol structure of the third generation UMTS mobile radio system, in accordance with the aforementioned document "Radio Interface Protocol Architecture".

The method can be implemented in two different ways, with a distinction being drawn between long-term resource allocation and short-term resource allocation.

The illustrative implementations described are based on control of the allocation of transmission rates to connections for signal transmission in the downlink DL, the use of orthogonal spreading codes being assumed for the uplink. The use of orthogonal spreading codes or alternatively a reception-end joint detection method causes the intracell interference to be suppressed, which means that the total transmission capacity is primarily dependent on the intercell interference. As a general feature, it is possible to stipulate that a subscriber station whose interference situation is predominantly determined by intercell interference ought to be allocated a relatively low transmission rate, whereas a subscriber station whose interference situation is predominantly determined by intercell interference ought to be allocated a higher transmission rate.

The method may be implemented for the case of long-term resource allocation, for example within the Radio Resource Control (RRC) function. According to the ISO OSI layer model, which was created for broad standardization of communication systems, the RRC function is a Layer 3 function.

When a connection is set up, a so-called set of transmission formats (Transport Format Set) is defined for each carrier on the basis of an available bandwidth and QoS demands, said set of transmission formats containing a set of different transmission rates and a respective reservation for a code with a corresponding spreading factor. This function provides long-term resource allocation for the requested radio channel resources and can allow for a so-called statistical multiplex advantage, resulting from reciprocal compensation for the transmission rate demand of carriers with a variable bit rate.

The RRC layer receives path damping measurements from various subscriber stations and controls the transmission rate of particular selected subscriber stations using the signaling procedure within the RRC layer. In this context, the following two procedures (for example) can be used for matching the transmission rates of the particular carriers to the currently available transmission capacities.

A Transport Format Set reconfiguration procedure can be used to vary the transmission rate. This is initiated by the utilization-level and connection-acceptance function and can be based on path damping measurements carried out by the respective subscriber station, for example for handover purposes. In this context, both the level of path damping for the dedicated base transceiver station and the level of path damping for neighboring base transceiver stations can be involved in the allocation.

A further significant RRC signal procedure is transport format restriction, which can be used for reducing the present transmission rate. Transmission rate restriction for non-real-time services with a high level of path damping is an efficient means of reducing the intensity, regularity and duration of an overload situation. This signaling procedure is requested by the overload checking function and can in turn be based on the path damping measurements of the subscriber stations. In general terms, it is practical to reduce only the transmission rates of one or more connections with a high level of path damping or a high transmitter power, rather than to reduce the transmission rates of all connections equally, irrespective of individual path damping levels or transmitter powers.

A second illustrative possibility for implementing the method can take place within the Media Access Control (MAC) layer for the purpose of so-called short-term resource allocation (packet scheduling). According to the ISO OSI layer model, the MAC function is assigned to Layer 2.

The MAC layer is responsible for the use of the various physical traffic channels (TCH). The MAC layer selects a particular transport format, essentially a particular transmission rate, from the set of transport formats defined during connection setup, as described. To ensure suitable or prioritized distribution of the available bandwidth on the basis of the present requirements of the various carriers, appropriate package scheduling algorithms can be used.

Transmission rate allocation based on the transmitter power requires the absolute or relative transmitter power for each carrier of a base transceiver station to be signaled to the radio network controller RNC via the Iub interface, as revealed in FIG. 1. This can be achieved, by way of example, by adding an appropriate field within the framework protocol defined on the Iub interface for transmitting transport blocks between the base transceiver station and the radio network controller. Another possibility is the use of independent signaling messages transmitted from a base transceiver station to the radio network controller, either cyclically or under event control. In this case, it is possible to use the proposed strategy for allocating the transmission rates within the Media Access Control layer. The MAC layer selects a suitable transport format, in particular a specific transmission rate, from the set of transport formats. As a general practice, the MAC facility, which is responsible for selection of the transport format on dedicated channels, takes into account merely the buffer status of the corresponding subscriber stations when making scheduling decisions. Additional consideration of the path damping or consideration of the transmitter power and of the buffer status of the connected carriers afford great potential for optimizing the total system throughput and for optimizing suitable distribution of the transmitter power in the downlink, which is the real transmission resource in a radio system using a CDMA method.

If, by way of example, a connection is in a so-called soft handover state, i.e. if signal transmission in the downlink is taking place in parallel in a plurality of radio cells, all the possible propagation paths for the signals need to be allowed for when allocating the transmission rate. This can be done, for example, by selecting the transmission rate such that it causes no impairment of the total transmission capacity of the system on any of the transmission paths—selection of the minimum transmission rate.

If the transmitter power is signaled to the radio network controller via the Iub interface, power-based bit rate allocation can also be used on a so-called shared channel, as proposed for the future UMTS mobile radio system. With this type of transport channel, bandwidth allocation and packet scheduling are carried out by the MAC layer in each case. These allocation and scheduling decisions should again be based on the required resources (buffer status of the various carriers) and the available resources (transmitter power or level of path damping) in this case too, in order to optimize the possible data throughput.

The implementations described can be used for different types of service.

Reduction of the transmission rate is primarily useful for non-real-time services, since, with these services, the data packets can be buffered if the transmission rate is lower than the reception rate for new data packets.

It is also possible to use the allocation strategy according to the invention for real-time services with an adaptive source rate. However, this requires the source coder to be checked by means of explicit signaling messages transmitted by the radio system to the transcoding unit. This method can be used for adaptive voice codecs, which are the standard codecs in the UMTS mobile radio system. The transmission rate of the codecs is then selected on the basis of the respective level of path damping or the transmitter power of the corresponding carriers.

The method described for transmission rate allocation supports further applications which may be significant for the future UMTS mobile radio system. This method can be used generally, because intercell and intercell interference is always dependent on the level of path damping for the various connections. This means that each subscriber station whose interference situation is primarily dominated by intercell interference (and which itself causes intercell interference to a large degree) should receive and transmit at a relatively low transmission rate, whereas a subscriber station which primarily experiences and generates intercell interference should receive and transmit at a higher transmission rate. For this reason, the method according to the invention has a significantly broader scope of use than described above. This will be explained using the examples below.

The method proposed can likewise be used for signal transmission in the uplink. This means that the total system throughput can be increased by allocating a relatively high transmission rate to the subscriber stations with a low level of path damping to the appropriate base transceiver station whose radio coverage range includes the subscriber station. By way of example, this procedure affords an increase in the transmission capacity for a wideband CDMA system operated in FDD mode.

This situation is improved further if, on the basis of transmission in the downlink, orthogonal spreading codes are also used in the uplink, or a joint detection method is carried out in the base transceiver station. These options advantageously allow any intercell interference arising to be effectively suppressed. In this case, the system capacity in the uplink is primarily restricted by intercell interference. Intercell interference can be reduced if the transmission rate of subscriber stations at the edge of the radio cell is reduced and the transmission rate of subscriber stations with a low level of path damping is increased. In this context, the transmitter power is a measure of the extent of intercell interference produced by a subscriber station. The same implementation options can be used as explained above for the downlink.

The method described can be used in the same way in other radio communication systems using a CDMA method. Examples of these are TDD mode in the UMTS mobile radio system,
Direct sequence CDMA,
Frequency hopping CDMA,
Time hopping CDMA.

I claim:

1. A method for allocating a transmission capacity to connections in a radio communication system, the method which comprises:
    allocating a transmission rate to a connection established via a radio communication interface between a base transceiver station and a subscriber station in dependence on a connection-specific path loss of the radio communication interface;
    allocating the transmission rate in dependence on an interference situation at a location of the subscriber station in a radio cell of the base transceiver station;
    carrying out, with a Radio Resource Control layer in the radio communication system, a long-term transmission rate allocation in dependence on at least one of the connection-specific path loss and a transmitter power;
    defining a set of different transport formats when the connection is set up;
    varying the transmission rate by using a Transport Format Set configuration/reconfiguration procedure of the Radio Resource Control layer; and
    selecting, with a Media Access Control layer, a suitable transport format from either the defined set of different transport formats or another set of different transport formats.

2. The method according to claim 1, which comprises allocating the transmission rate in dependence of a distance between the subscriber station and the base transceiver station.

3. The method according to claim 1, wherein the interference situation at a location of the subscriber station comprises at least one of intracell interference and intercell interference.

4. The method according to claim 1, which comprises providing a variable transmission rate for transmitting at least one service with the connection.

5. The method according to claim 4, which comprises providing a non-real-time service as the at least one service.

6. The method according to claim 4, which comprises:
    providing a real-time service as the at least one service; and
    carrying out an adaptive source coding.

7. The method according to claim 1, which comprises allocating a specific transmission rate for a specific spectrum of path losses.

8. The method according to claim 1, which comprises additionally varying the transmission rate in dependence of a relative transmitter power for the connection.

9. The method according to claim 1, which comprises additionally varying the transmission rate in dependence of an absolute transmitter power for the connection.

10. The method according to claim 1, which comprises additionally varying the transmission rate in dependence of a current traffic load in a radio cell of the base transceiver station.

11. The method according to claim 1, which comprises varying the transmission rate in at least one of a downlink direction from the base transceiver station to the subscriber station and in an uplink direction from the subscriber station to the base transceiver station in dependence of respective path losses.

12. The method according to claim 1, which comprises carrying out a subscriber separation in a radio communication system in accordance with a CDMA method.

13. The method according to claim 1, which comprises using orthogonal spreading codes in at least one of a downlink direction and an uplink direction.

14. The method according to claim 1, which comprises providing a set of transmission rates for the connection, the transmission rates being defined by respective spreading codes and respective spreading factors.

15. The method according to claim 1, which comprises allocating the transmission rate by using a utilization-level and connection-acceptance control function of the Radio Resource Control layer.

16. The method according to claim 1, which comprises:
    selecting, with the Media Access Control layer, a suitable one of the different transport formats in a soft handover situation by taking into account all possible signal paths.

17. The method according to claim 1, which comprises:
    carrying out, with subscriber stations, path loss measurements for handover purposes; and using the path loss measurements for the step of allocating the transmission rate.

18. The method according to claim 1, which comprises initiating a variation of the transmission rate with an overload control function based on path loss measurements of the subscriber station.

19. The method according to claim 1, which comprises signaling a transmitter power for a carrier of the base transceiver station to a radio network controller via an Iub interface.

20. The method according to claim 1, which comprises signaling a transmitter power for a carrier of the base transceiver station to a radio network controller via an Iub interface by adding an appropriate field within an Iub/Iur user frame protocol.

21. The method according to claim 1, which comprises signaling a transmitter power for a carrier of the base transceiver station to a radio network controller via an Iub interface by using independent periodic signaling messages.

22. The method according to claim 1, which comprises signaling a transmitter power for a carrier of the base transceiver station to a radio network controller via an Iub interface by using event-controlled signaling messages.

23. The method according to claim 1, which comprises allocating the transmission rate additionally for a shared channel in a downlink direction in dependence of a transmitter power.

24. The method according to claim 1, which comprises carrying out a joint detection method at a reception end in at least one of a downlink direction and an uplink direction.

25. The method according to claim 1, which comprises:
    organizing the radio communication interface in accordance with a TDD method using a plurality of time slots forming a time frame; and
    providing respective transmissions in a downlink direction and in an uplink direction at separate times in a same frequency band.

26. The method according to claim 1, which comprises providing the radio communication system as a mobile radio system.

27. The method according to claim 1, which comprises providing the radio communication system as a wireless subscriber line system.

28. The method of claim 1, wherein the other set of transport formats in the selecting step is defined using one of a transport format set configuration/reconfiguration procedure and a transport format restriction procedure.

29. A method for allocating a transmission capacity to connections in a radio communication system, the method which comprises:
   allocating a transmission rate to a connection established via a radio communication interface between a base transceiver station and a subscriber station in dependence on a connection-specific path loss of the radio communication interface;
   allocating the transmission rate in dependence on an interference situation at a location of the subscriber station in a radio cell of the base transceiver station;
   carrying out, with a Radio Resource Control layer in the radio communication system, a long-term transmission rate allocation in dependence on at least one of the connection-specific path loss and a transmitter power;
   defining a set of different transport formats when the connection is set up;
   varying the transmission rate by using a Transport Format Set restriction procedure of the Radio Resource Control layer; and
   selecting a suitable transport format from either the defined set of different transport formats or another set of different transport formats.

30. A method for allocating a transmission capacity to connections in a radio communication system, the method which comprises:
   allocating a transmission rate to a connection established via a radio communication interface between a base transceiver station and a subscriber station in dependence on a connection-specific path loss of the radio communication interface;
   allocating the transmission rate in dependence on an interference situation at a location of the subscriber station in a radio cell of the base transceiver station,
   defining a set of different transport formats when the connection is set up;
   varying the transmission rate by using a Transport Format Set configuration/reconfiguration procedure;
   carrying out a rate allocation in dependence on at least one of the connection-specific path loss and a transmitter power; and
   selecting, with a Media Access Control layer, a suitable transport format from either the defined set of different transport formats or another set of different transport formats.

* * * * *